(12) United States Patent
Calebrese et al.

(10) Patent No.: US 10,700,564 B2
(45) Date of Patent: Jun. 30, 2020

(54) MANUFACTURING METHOD FOR A CONDUCTOR DISPOSED WITHIN AN INSULATOR

(71) Applicant: General Electric Company, Schenectady, NY (US)

(72) Inventors: Christopher Michael Calebrese, Cohoes, NY (US); Jeffrey S. Sullivan, Rexford, NY (US); Qin Chen, Schenectady, NY (US); Benjamin Hale Winkler, Albany, NY (US); Kevin Warner Flanagan, Troy, NY (US); Anil Raj Duggal, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 455 days.

(21) Appl. No.: 15/489,443

(22) Filed: Apr. 17, 2017

(65) Prior Publication Data

US 2018/0301244 A1 Oct. 18, 2018

(51) Int. Cl.
*H02K 15/00* (2006.01)
*H02K 3/12* (2006.01)
(Continued)

(52) U.S. Cl.
CPC ............... *H02K 3/12* (2013.01); *H02K 3/24* (2013.01); *H02K 3/40* (2013.01); *H02K 3/30* (2013.01);
(Continued)

(58) Field of Classification Search
CPC ......... Y10T 29/49009; Y10T 29/49208; Y10T 29/49117; Y10T 29/49171; Y10T 29/4922;
(Continued)

(56) References Cited

U.S. PATENT DOCUMENTS 6,242,825 B1  6/2001  Mori et al.
6,815,012 B2  11/2004  Baumann et al.
(Continued)

FOREIGN PATENT DOCUMENTS

CN    101010849 A    8/2007
CN    102207007 A    10/2011
(Continued)

OTHER PUBLICATIONS

Liu, Chenyang, et al.;"Design of high thermal conductivity insulation adhesive (H-class) for low voltage motor", IEEE Transactions on Dielectrics and Electrical Insulation, vol. 23, Issue: 4, pp. 1907-1914, Sep. 8, 2016.
(Continued)

*Primary Examiner* — Thiem D Phan
(74) *Attorney, Agent, or Firm* — Fletcher Yoder, P.C.

(57) ABSTRACT

A method includes forming one or more cores, wherein each of the one or more cores has a cross section corresponding to a conductor to be subsequently formed, forming an insulator around the one or more cores, removing the one or more cores to expose one or more recesses within the insulator, and forming one or more conductors in at least one of the one or more recesses of the insulator such that the cross sections of the one or more conductors conform to an interior surface of the one or more recesses in the insulator.

8 Claims, 2 Drawing Sheets

(51) Int. Cl.
*H02K 3/24* (2006.01)
*H02K 3/40* (2006.01)
*H02K 3/30* (2006.01)
*H02K 3/34* (2006.01)

(52) U.S. Cl.
CPC ......... *H02K 3/345* (2013.01); *Y10T 29/49009* (2015.01)

(58) Field of Classification Search
CPC ........ Y10T 29/49165; Y10T 29/49222; B33Y 10/00; C23C 18/31
USPC ......... 29/596, 598, 605, 606, 732, 837, 849, 29/852, 884
See application file for complete search history.

(56) References Cited

U.S. PATENT DOCUMENTS

| | | | |
|---|---|---|---|
| 7,655,868 B2 | 2/2010 | Sheaffer et al. | |
| 7,804,385 B2 | 9/2010 | Snyder | |
| 7,969,049 B2 | 6/2011 | Laskaris et al. | |
| 8,030,818 B2 | 10/2011 | Nelson et al. | |
| 8,636,463 B2 | 1/2014 | Vehr | |
| 8,918,986 B2 | 12/2014 | Guercioni | |
| 9,123,778 B2 * | 9/2015 | Lai | H01L 27/11568 |
| 10,186,921 B2 | 1/2019 | Takahashi et al. | |
| 2005/0108875 A1 * | 5/2005 | Mathieu | G01R 1/06711 29/852 |
| 2017/0047803 A1 | 2/2017 | Scherer et al. | |

FOREIGN PATENT DOCUMENTS

| | | |
|---|---|---|
| CN | 102447331 A | 5/2012 |
| CN | 102823114 A | 12/2012 |
| CN | 103051092 A | 4/2013 |
| CN | 103903706 A | 7/2014 |
| CN | 104682587 A | 6/2015 |
| CN | 104953729 A | 9/2015 |
| CN | 205039638 U | 2/2016 |
| JP | 2016201930 A | 12/2016 |
| WO | 2015150556 A1 | 10/2015 |

OTHER PUBLICATIONS

Office Action in CN Application No. 201810342923.3 dated Sep. 25, 2019, with English Translation, 22 pages.

* cited by examiner

MANUFACTURING METHOD FOR A CONDUCTOR DISPOSED WITHIN AN INSULATOR

BACKGROUND

The subject matter disclosed herein relates to windings of electric machines, and more specifically, to an improved interface between conductors and insulators in the windings.

Electric machines (e.g., generators and motors) may be used to convert mechanical energy into electrical energy, or vice versa. Electric machines typically include a plurality of conductors bound together (e.g., a winding) and routed along a path throughout the electric machine, resulting in a plurality of windings disposed circumferentially within the electric machine. Typically, each winding is formed by bundling or braiding a plurality of individually insulated conductors, wrapping the bundle in mica tape or mica paper (i.e., turn insulation), and wrapping a group of insulated conductor bundles in mica tape (ground wall insulation). However, such techniques may result in cracks, wrinkles, or other voids that includes pockets of air. If a voltage stress across the void exceeds a corona inception voltage for the gas within the void, partial discharge will occur within the void. Partial discharge may degrade the insulator around the void, creating paths that may lead to electrical or structural failure of the insulator.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a method includes forming one or more cores, wherein each of the one or more cores has a cross section corresponding to a conductor to be subsequently formed, forming an insulator around the one or more cores, removing the one or more cores to expose one or more recesses within the insulator, and forming one or more conductors in the one or more recesses of the insulator such that the cross sections of the one or more conductors conform to an interior surface of the one or more recesses in the insulator.

In a second embodiment, a system includes: a ceramic insulator defining one or more recesses extending along a length of the insulator, and one or more conductors formed within each of the one or more recesses, wherein an exterior surface of each of the one or more conductors conforms to an interior surface of the one or more recesses, and wherein the one or more conductors are configured to conduct an electrical current.

In a third embodiment, a system includes a monolithic insulator defining one or more recesses extending along a length of the insulator, and one or more conductors formed within each of the one or more recesses, wherein an exterior surface of each of the one or more conductors conforms to an interior surface of the one or more recesses, and wherein the one or more conductors are configured to conduct an electrical current, wherein at least one of the one or more conductors defines a cooling channel extending through the conductor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The presently disclosed techniques include windings that have conductors extending through an insulator. The exterior surface of the conductors conforms to the interior surface of the insulator, eliminating or reducing the number of voids or reducing the size of the voids, and thus the instances of partial discharge within the winding during operation. In some embodiments, the conductor may include a cooling channel for coolant fluid, resulting in improved thermal performance of the winding.

Figure 1:
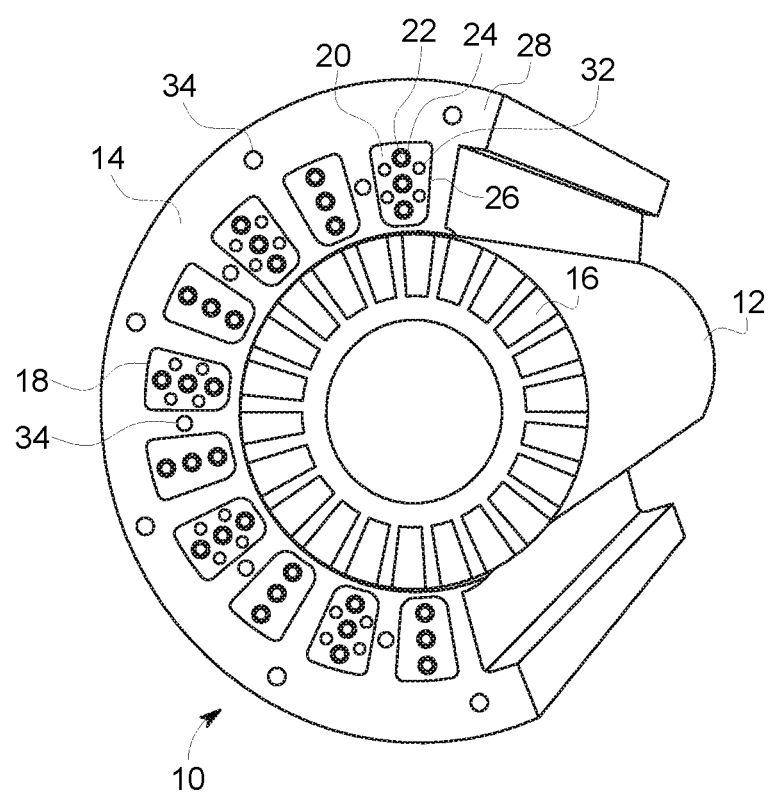
FIG. 1 is a cut-away view of an electric machine, in accordance with an embodiment.

FIG. 1 is a cut-away view of one embodiment of an electric machine 10 (e.g., an electric motor or a generator). The electric machine 10 includes a rotor 12 that rotates within a stator 14. The rotor 12 may include a plurality of magnets 16. The stator 14 may include windings 18 disposed circumferentially about the rotor. In some embodiments, both the rotor 12 and the stator 14 may have windings 18. For generators, as the rotor 12 rotates within the stator 14, a voltage is created by way of magnetic induction, thus converting mechanical energy into electrical energy. For motors, alternating electric currents through the windings 18 create magnetic fields that cause the rotor 12 to rotate within the stator 14. It should be understood, however, that in some embodiments the placement of the magnets 16 and windings 18 may be reversed. That is, in some embodiments the windings 18 may be a part of the rotor 12 and the magnets 16 may be part of the stator 14.

Windings 18 typically include individually insulated strands of copper bundled together, wrapped in mica tape or paper, and then covered with ground wall insulation, which may also include of mica tape. While mica tape is good for covering convex surfaces, taping convex surfaces and around corners can lead to wrinkles and other voids at conductor-insulator interfaces, as well as between layers of insulation. If the voltage stress across the void exceeds the corona inception voltage for the gas within the void, partial discharge will occur within the void. Partial discharge may result in plasma, ozone, and/or ultraviolet (UV) light in the void, which can erode the insulation and may create paths that lead to electrical or structural failure of the insulator. Additionally, the thermal conductivity of commonly used mica tape insulators is around 0.2 to 0.3 W/mK, which is lower than desired, preventing the windings 18 from dissipating heat at a desirable rate. In contrast, the presently disclosed techniques include forming conductors in the insulator such that the exterior surface of each conductor conforms to the interior surface of the respective insulator. The disclosed techniques also reduce or eliminate voids within the insulator. Additionally, use of the disclosed techniques enables the use of materials not previously available for forming windings. For example, the disclosed techniques allow the formation of void-free monolithic insulators of complex shapes. Use of ceramics may increase thermal conductivity by 100 times or more and increase operating temperatures by 200 degrees Celsius or more.

In the illustrated embodiment, each winding 18 includes an insulator 20 having one or more recesses 22, and one or more conductors 24 extending through the recesses 22. In some embodiments, some or all of the conductors 24 may only occupy a portion of the cross sectional area of its respective recess 22, defining a cooling channel 30 extending through the middle of the conductor 24. In some embodiments, one or more of the insulators 20 may be equipped with cooling channels 32. Similarly, in some embodiments, the body 28 of the stator 12 may also be outfitted with cooling channels 34.

In some embodiments, a layer of semiconductive material 26 (e.g., $10^{-3}$ S/m to $10^3$ S/m carbon-black filled polymer) may be disposed between each winding 18 and a body 28 of the stator 14. The semiconductive material 26 may completely surround the winding 18 such that the winding 18 does not contact the body 28 of the stator 14, or the semiconductive material 26 may only be disposed between the winding 18 and the stator body 28 along one surface, or a part of a surface of the winding 18. The semiconductive material prevents an electric field from forming between the winding 18 and the stator body 28. The stator body 28 may be made of any magnetic material, such as a soft magnetic material. In some embodiments, a mechanically compliant layer of material may also be disposed between each winding 18 and the body 28 of the stator 14. In some embodiments, the semiconductive material 26 may be separate from the mechanically compliant material. In other embodiments, a single layer of mechanically compliant semiconductive material 26 may be used.

By using a core and die techniques to manufacture the windings 18, the number and size of voids, and instances of partial discharge, may be reduced. The resulting winding 18 may be better performing than presently used windings.

Figure 2:
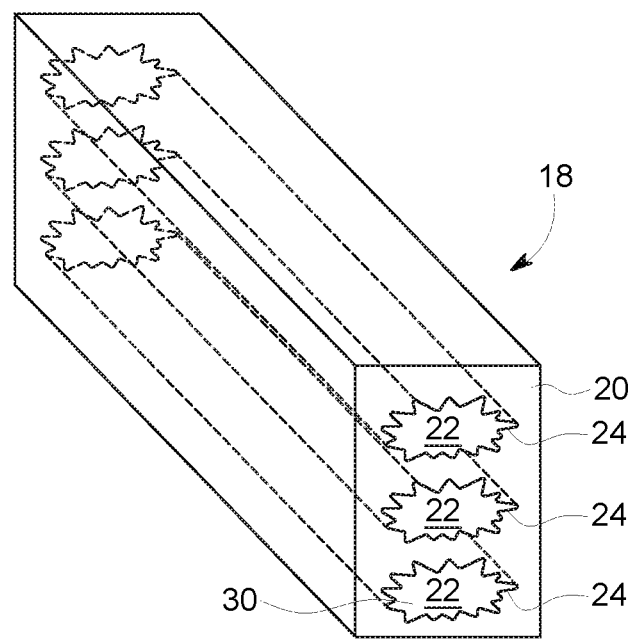
FIG. 2 is a perspective section view of a winding of the electric machine shown in FIG. 1, in accordance with an embodiment.

FIG. 2 is a perspective section view of one of the windings 18 shown in FIG. 1, in accordance with an embodiment. As illustrated, each winding 18 includes an insulator 20. In the illustrated embodiment, the insulator 20 is made of a corona-proof or corona resistant ceramic, which may reduce partial discharge damage during operation. However, the insulator may be made of other materials not specifically designed to be corona resistant. The material used to form the insulator may also have low porosity (e.g., 0-10%), or no porosity, in order to further minimize voids in the material and reduce instances of partial discharge during operation. The insulator 20 may also be made of a thermally conductive material to dissipate heat. For example, the insulator 20 may also have a thermal conductivity between 3-30 W/mK, or higher. In other embodiments, the insulator 20 may not be ceramic at all. For example, for some applications (e.g., for lower cost applications), the insulator may be made of a polymer, or some other insulating material with low porosity and high thermal conductivity.

The insulator 20 may be formed in a variety of ways. In the illustrated embodiment, the insulator is molded using core and die techniques. However, the insulator may be 3D printed, sintered, extruded, cast (e.g., tape cast, slip cast, shell cast, etc.), pressed, and so forth.

One or more conductors 24 extend through the recesses in the insulator 20. In the illustrated embodiment, the winding 18 has 3 conductors 24, however, the winding 18 may include any number of conductors 24. That is, the winding 18 may include 1, 2, 3, 4, 5, 6, 7, 8, 9, 10, 11, 12, 13, 14, 15, 16, 17, 18, 19, 20, or more conductors 24. Similarly, the illustrated conductors 24 have a somewhat flower-shaped cross section. However, in other embodiments, the conductors 24 may have a cross section of any shape. For example, each conductor 24 may be triangular, square, rectangular, pentagonal, hexagonal, heptagonal, octagonal, decagonal, or any other shape. In some embodiments, it may be beneficial to have soft edges with smooth transitions. Accordingly, in some embodiments, the cross sectional shape of each conductor 24 may be a lobed polygon having any number of sides.

Each of the conductors 22 may occupy the less than the entire cross section of its respective recess 22, thereby defining a cooling channel 30 through the conductor 24. However, in some embodiments, the conductor 24 may occupy the entire cross section of the recess 22.

In the illustrated embodiment, the conductor 24 is made of copper or a copper alloy. However, the conductor 24 may be formed of any other conductive material. For example, in some embodiments, the conductor 24 may be formed of a conductive composite material. In some embodiments, the conductive material may be enhanced (e.g., with carbon nanotubes) to increase electrical conductivity.

As will be described in more detail below, the conductor 24 may be formed within the recess 22 of the insulator 24 by sintering, electroplating, electroless plating, spraying, painting, hydroforming, or pouring molten metal into the recess 22, such that an exterior surface of the conductor 24 conforms to an interior surface of the insulator 20.

Conductors 24 that conduct alternating currents experience a phenomenon known as the "skin effect". That is, the current density of the conductor 24 is much higher along the exterior surface of the conductor 24 than in the interior of the conductor 24. Because of the skin effect, most of the current transmitted by the conductor 24 is transmitted at or near the exterior surface of the conductor 24. As the frequency of the alternating current increases, the skin effect becomes more pronounced. That is, as the frequency of the alternating current increases, the current density becomes much more concentrated at the exterior surface of the conductor 24. Because of the skin effect, the cooling channel 30 may extend through the center of each conductor 24 without inhibiting the conductor's 24 ability to conduct electric current. Further, because a working frequency range of the electric machine 10 is known, the size of the conductor 24 and the size of the cooling channel 30 may be dimensioned to take advantage of the skin effects at the working frequency ranges.

The cooling channel 30 may be filled with a coolant fluid. The coolant fluid may flow through the cooling channel, or the coolant fluid may remain stationary (e.g., as in a heat pipe). The coolant fluid draws heat from the conductor 24, allowing the conductor 24 to conduct more electric current than would otherwise be possible without the temperature of the conductor 24 increasing. In some embodiments, the cross sectional shape of the cooling channel 30 may vary along its length in order to generate turbulent flows in the coolant fluid and increase heat dissipation from the conductor 24. In some embodiments, the cross sectional shape of the cooling channel 30 may vary without corresponding changes in the cross sectional area of the cooling channel 30 and/or the conductor 24.

The various windings 18 of an electric machine 10 may be electrically coupled to one another by end windings, a manifold end cap, a single end piece, or some other end cap structure. In some embodiments, the end cap structure may only act an as an electric coupling between windings. In other embodiments, the end cap structure may route coolant fluid (e.g., receive coolant fluid from one cooling channel and route to a second cooling channel). In such an embodiment, the end cap structure may include a manifold and/or a pump. In further embodiments, the end cap structure may help to provide structural support for the electric machine 10.

Figure 3:
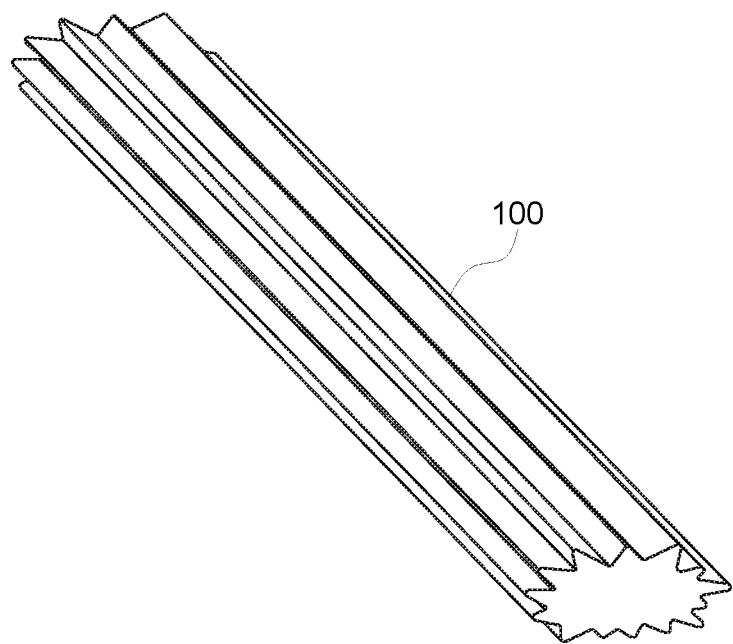
FIG. 3 is a perspective view of a core, in accordance with an embodiment.

Manufacturing the windings 18 begins by manufacturing a core having substantially the same exterior dimensions as the desired conductor 24. FIG. 3 is a perspective view of the core 100, in accordance with an embodiment. As illustrated, the core 100 has substantially the same exterior dimensions as the conductor 24 shown in FIG. 2. In the illustrated embodiment, the core 100 is 3D printed, allowing for a wide range of geometries. However, in other embodiments, the core 100 may be formed by milling, turning on a lathe, electrical discharge machine (EDM), molding, extruding, casting, pressing, some other manufacturing technique, or a combination thereof. In the instant embodiment, the core 100 is disposable in that the insulator 20 is formed around the core 100, and then the core 100 is removed and disposed of. The conductor 24 may then be formed in the insulator 20 in the volume vacated by the core 100. However, in some embodiments, the core 100 may be formed of conductive material and act as the conductor 24 once the insulator 20 has been formed around it.

In some embodiments, the core 100 may be coated (e.g., with a stress grading material or a metal base layer) such that when the core 100 is burned out (i.e., removed from the insulator 20 by heating), the coating is imparted to the interior surface of the insulator.

Figure 4:
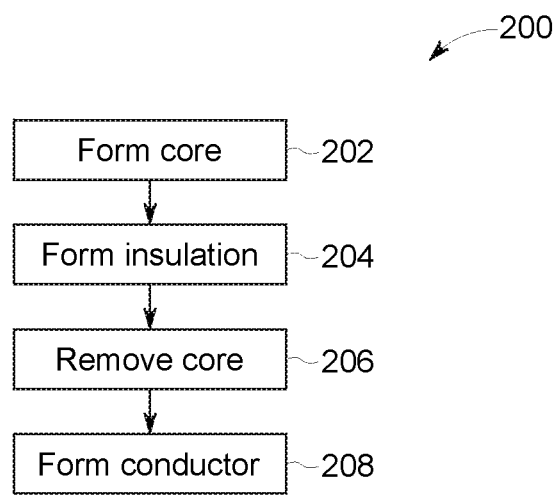
FIG. 4 is a flow chart of a process for manufacturing the winding shown in FIG. 2, in accordance with an embodiment.

FIG. 4 is a flow chart of a process for manufacturing a winding 18, in accordance with an embodiment. In block 202, the core is formed. The exterior surface of the core may have substantially the same dimensions as the exterior surface of the desired conductor. As previously described, in the present embodiment, the core is 3D printed. However, in other embodiments, the core may be machined, cast, extruded, molded, pressed, formed by some other technique, or some combination thereof. In some embodiments, the exterior surface of the core may be coated with a material intended to be transferred to the interior surface of the insulator.

In block 204, the insulator is formed around the core. As previously described, the insulator may have multiple conductors. Accordingly, the insulator may be formed around multiple cores. The insulator may be made of a ceramic (e.g., a low porosity or no porosity, corona resistant ceramic), a polymer, or some other material. As previously described, the insulator may be fabricated using core and die techniques around one or more cores. In other embodiments, the insulator may be 3D printed, sintered, extruded, cast (e.g., tape cast, slip cast, shell cast, etc.), pressed, etc. In some embodiments, the insulator may go through a pre-stressing process at any point after the insulator has been formed.

In block 206, the core is removed from the insulator. The core may be removed by heating the core beyond its melting point, such that the core melts and runs out of the insulator. In other embodiments, the core may be burned out, leaving the one or more recesses. In embodiments in which the exterior surface of the core was coated, the coating may be transferred to the interior surface of the insulator when the core is removed. As previously discussed, in some embodiments, the core may be made of a conductive material and later used as a conductor. In such embodiments, the core may not be removed from the insulator and block 206 may be omitted.

In block 208, the conductor is formed within the recess of the insulator left by the core. As previously discussed, the conductor may be formed by sintering, electroplating, electroless plating, spraying, painting, hydroforming, pouring molten metal into the recess or some other process. The conductor may be made of copper, a copper alloy, a multi-layer conductor consisting of multiple metals, a conductive composite, or some other conductive material. In some embodiments, the material forming the conductor may be enhanced with metal or carbon nanotubes for increased electrical conductivity. In some embodiments, the conductor may not fill the entire recess, leaving a cooling channel extending through the conductor through which coolant fluid may flow. In other embodiments, the conductor may occupy the entire recess vacated by the core.

It should be understood, however, that assembly of the winding as shown in FIG. 4 may not be done entirely by one entity. For example, in one embodiment, the winding may arrive at a customer partially assembled, or the customer may obtain different parts of the winding from different vendors and then assemble the winding themselves.

The present disclosure includes windings for use in electric machines and a process for manufacturing said windings. By forming the insulator around one or more cores that mimic the desired shape of conductors, removing the one or more cores, and forming the one or more conductors in the spaces vacated by the cores, the presence of voids that facilitate partial discharge may be reduced, extending the life of the electric machine. Further, a cooling channel extending through the conductors may improve the thermal performance of the electric machine, allowing the conductors to conduct more electricity without a corresponding increase in temperature. In sum, the disclosed techniques may result in higher power density, higher reliability, and longer life spans for electric machines.

This written description uses examples to disclose the claimed subject matter, including the best mode, and also to enable any person skilled in the art to practice the disclosed subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    forming one or more cores, wherein each of the one or more cores has a cross section corresponding to a conductor to be subsequently formed;
    forming an insulator around the one or more cores;
    removing the one or more cores to expose one or more recesses within the insulator; and
    forming one or more conductors in at least one of the one or more recesses of the insulator such that the cross sections of the one or more conductors conform to an interior surface of the one or more recesses in the insulator.

2. The method of claim 1, wherein the insulator comprises a ceramic material.

3. The method of claim 1, wherein the insulator comprises a polymer.

4. The method of claim 1, wherein forming the one or more conductors comprises plating a conductive material onto the one or more interior surfaces of the one or more recesses of the insulator.

5. The method of claim 4, wherein at least one conductor of the one or more conductors defines a cooling channel extending through the at least one conductor of the one or more conductors.

6. The method of claim 5, wherein the cooling channel comprises a varying cross sectional shape along a length of the cooling channel.

7. The method of claim 1, wherein forming the one or more conductors comprises pouring molten metal into the one or more recesses.

8. The method of claim 1, wherein forming the insulator around the one or more cores comprises molding the insulator around one or more cores.

* * * * *